(12) United States Patent
Tiwari et al.

(10) Patent No.: US 11,490,352 B2
(45) Date of Patent: *Nov. 1, 2022

(54) HANDLING OF TEMPORARY NON ACCESS STRATUM PARAMETERS DURING REGISTRATION PROCEDURE FOR THE UE SUPPORTING TO THE NETWORK USING 3GPP NETWORK ACCESS AND NON-3GPP NETWORK ACCESS

(71) Applicant: NEC Corporation, Tokyo (JP)

(72) Inventors: Kundan Tiwari, Chennai (IN); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,903

(22) Filed: Oct. 8, 2021

(65) Prior Publication Data
US 2022/0030538 A1 Jan. 27, 2022

Related U.S. Application Data

(63) Continuation of application No. 16/323,728, filed as application No. PCT/JP2019/000339 on Jan. 9, 2019, now Pat. No. 11,172,458.

(30) Foreign Application Priority Data
Mar. 28, 2018 (IN) .............................. 201811011620

(51) Int. Cl.
*H04W 60/00* (2009.01)
*H04W 8/26* (2009.01)
*H04W 88/06* (2009.01)
*H04W 92/02* (2009.01)

(52) U.S. Cl.
CPC .......... *H04W 60/005* (2013.01); *H04W 8/26* (2013.01); *H04W 88/06* (2013.01); *H04W 92/02* (2013.01)

(58) Field of Classification Search
CPC combination set(s) only.
See application file for complete search history.

(56) References Cited

PUBLICATIONS

Intel, Update to support of non-3GPP access in 5GC, 3GPP TSG SA WG2 #123 S2-177046, Oct. 17, 2017.
3GPP TR 24.890 V15.0.0, 3$^{rd}$ Generation Partnership Project; Technical Specification Group Core Network and Terminals, Dec. 28, 2017.
International Search Report PCT/JP2019/000339 dated Apr. 16, 2019.
3GPP TR21.905 V14.1.1 (2017-16), "3$^{rd}$ Generation Partnership Project; Technical Specification Group Services and System Aspects; Vocabulary for 3GPP Specifications, (Release 14)", pp. 1-66, (2017).

(Continued)

*Primary Examiner* — Erica Navar

(57) ABSTRACT

This disclosure handles a registration procedure in a UE supporting registration to 5GC via untrusted non-3GPP access network and 3GPP access network. More specifically this disclosure defines a UE behavior when a registration procedure is not successful to 5GC via first access network type (e.g. untrusted non-3GPP network access) after transmitting maximum number of registration request message via the first access network type to the 5GC and the UE is registered to 5GC via other access network type (e.g. 3GPP access network (NG-RAN)).

2 Claims, 7 Drawing Sheets

(56) References Cited

PUBLICATIONS

3GPP TS23.501 V15.0.0 (Dec. 2017), "$3^{rd}$ Generation Partnership Project; Technical Specification Group Services and System Aspects; System Architecture for the 5G System; Stage 2, (Release 15)", pp. 1-181, (2017).
3GPP TS24.501 V1.0.0 (Mar. 2018), "$3^{rd}$ Generation Partnership Project; Technical Specification Group Core Network and Terminals; Non-Access-Stratum (NAS) Protocol for 5G System (5GS); Stage 3, (Release 15)", pp. 1-253, (2018).
3GPP TS38.300 V15.0.0 (Dec. 2017), "$3^{rd}$ Generation Partnership Project; Technical Specification Group Radio Access Network; NR; NR and NG-RAN Overall Description; Stage 2, (Release 15)", pp. 1-68, (Dec. 2017).
Extended European Search Report for EP Application No. 19775078.9 dated May 3, 2021.
LG Electronics • Clarification on Registration over 3GPP access and non-3GPP access, 3GPP Draft, 3GPP TSG-CT WG1 Meeting#106, C1-174329, Oct. 27, 2017, India.
Intel: "Update to support of non-3GPP access in 5GC", 3GPP Draft; SA WG2 Meeting #124, S2-178316, Nov. 21, 2017, USA.
"3rd Generation Partnership Project Technical Specification Group Core Network and Terminals; 5G System—Phase 1: CT WG1 Aspects (Release 15)", 3GPP TR 24.890 V15'1.0 (Mar. 2018), Mar. 20, 2018.

HANDLING OF TEMPORARY NON ACCESS STRATUM PARAMETERS DURING REGISTRATION PROCEDURE FOR THE UE SUPPORTING TO THE NETWORK USING 3GPP NETWORK ACCESS AND NON-3GPP NETWORK ACCESS

CROSS-REFERENCE TO RELATED PATENT APPLICATIONS

This application is a continuation of U.S. patent application Ser. No. 16/323,728, filed Feb. 6, 2019, which is a National Stage Entry of International Application No. PCT/JP2019/000339, filed Jan. 9, 2019, which claims priority from Indian Patent Application No. 201811011620, filed Mar. 28, 2018. The entire contents of the above-referenced applications are expressly incorporated herein by reference.

TECHNICAL FIELD

This disclosure is related to handling of the temporary NAS parameters (Temporary mobile identity, Security parameter, etc) assigned to the UE by the network during the registration procedure of the UE over one access network type to the 5GC, when the registration procedure over other access types to the same PLMN fails due to no response from the network to the number of Registration Request messages transmitted.

BACKGROUND ART

In general the temporary NAS parameters assigned to the UE are associated with a single access network node type. But scenario when the UE is registered to a PLMN via two access network types simultaneously, then the single AMF is chosen for both access network type. In this scenario, the network assigns some common NAS parameters (temporary mobile identity, security parameters, etc) to the UE for both access network types.

When a UE has registered to 5GC (AMF) via both non-3GPP access network and 3GPP access network at the same time, the UE maintains two independent 5GMM registration status and 5GMM contexts one for 3GPP access network and another for non-3GPP access. When the registered PLMNs for 3GPP access network and non-3GPP access network are same then the UE is connected to the same AMF. In this scenario the 5GC (AMF) assigns same NAS parameters e.g. UE temporary identity (5G-GUTI) and ngKSI to both 5GMM context for 3GPP access network and non-3GPP access network.

SUMMARY OF INVENTION

Technical Problem

Problem Statement 1:

When the UE has registered to a PLMN via one access network type (e.g. non-3GPP access network) and thereafter an initial registration procedure via another access network type (e.g. 3GPP access network) may be failed. In detail, a failure of the initial registration procedure can occur in case there is no response from the network to the UE after maximum number of transmission of registration request message from the UE. In this failure situation, the UE behavior is not clear whether the UE temporary identity and ngKSI are deleted from both 3GPP 5GMM context and non-3GPP 5GMM context or deleted from the 5GMM context of the access network type (3GPP access network here) where the registration procedure failed over the another access network. In case the UE deletes common parameters (e.g. temporary identity and ngKSI) for both 3GPP 5GMM context and non-3GPP 5GMM context due to the registration procedure failure in one access network type, some features with the other access network type will stop working. This can be considered as a serious service degradation.

Problem Statement 2:

When the UE has registered to a PLMN via both a first access network type and a second access network type, the UE initiates a NAS procedure to perform mobility update procedure or periodic update procedure over one access network type. And then, the network updates a temporary parameter (e.g. 5G-GUTI) with new value by including the parameters in a NAS message sent to the UE during the current NAS procedure, then the network will wait for an another NAS message in response of the NAS message containing the temporary parameter. In this scenario, the network behavior is not clear whether the network will keep and treat the new value to the parameter as valid or the old value of the parameter. In other scenario when the network initiates a procedure to update a temporary parameter (e.g. 5G-GUTI) which is common to both the first access network type and the second access network type by sending a NAS message to UE and the network does not receive the NAS message response from the UE after certain number of retries by re-sending the NAS message to UE. In this scenario, the network behavior is not clear whether the network will use the old or the new value after certain number of retry. In case the network uses only the new value of temporary parameter (i.e. 5G-GUTI) when the network pages the UE, the paging procedure may fail since the UE may use the old value of temporary parameter (i.e. 5G-GUTI). Due to the mismatch between the UE and the network, the UE cannot be reached from the network. This can be considered as a serious service degradation.

The FIG. 1 illustrates the architecture that this failure situation occurs.

Solution to Problem

A method of a user equipment performing a registration procedure with a same Access and mobility Management Function (AMF) via both a 3rd Generation Partnership Project (3GPP) access and a non-3GPP access according to a first exemplary aspect of the present disclosure includes initiating the registration procedure with the AMF via one access network among the 3GPP access and the non-3GPP access, in a case where the user equipment has already been registered with the AMF via another access network that is different from the one access network, starting a timer T3510 when the registration procedure via the one access network is initiated, and counting a number of times of registration attempt via the one access network based on expiry of the timer T3510, wherein the user equipment is capable of keeping a 5G-Globally Unique Temporary Identity (5G-GUTI) that has been assigned for the another access network, even if the number of times of the registration attempt via the one access network is equal to a predetermined number, wherein the 5G-GUTI is common to both the 3GPP access and the non-3GPP access.

A user equipment performing a registration procedure with a same Access and mobility Management Function (AMF) via both a 3rd Generation Partnership Project (3GPP) access and a non-3GPP access according to a second exemplary aspect of the present disclosure includes a transceiver and a processor configured to initiate the registration procedure with the AMF via one access network among the 3GPP access and the non-3GPP access, in a case where the user equipment has already been registered with the AMF via another access network that is different from the one access network, start a timer T3510 when the registration procedure via the one access network is initiated, and count a number of times of registration attempt via the one access network based on expiry of the timer T3510, wherein the user equipment is capable of keeping a 5G-Globally Unique Temporary Identity (5G-GUTI) that has been assigned for the another access network, even if the number of times of the registration attempt via the one access network is equal to a predetermined number, wherein the 5G-GUTI is common to both the 3GPP access and the non-3GPP access.

DESCRIPTION OF EMBODIMENTS

Figure 1:
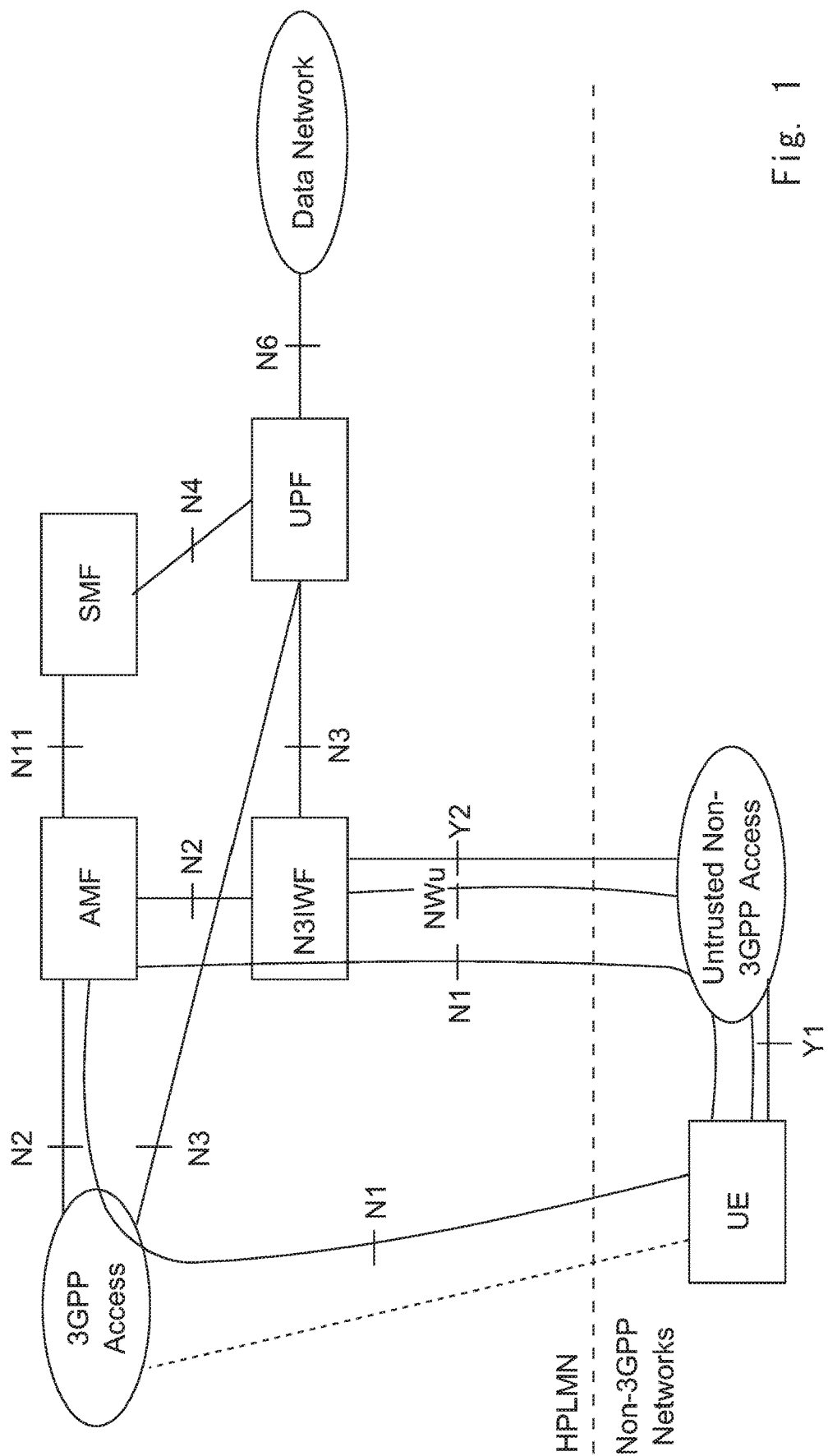
FIG. 1 shows Non-roaming architecture for 5G Core Network with non-3GPP access.

For the purposes of the present document, the abbreviations given in 3GPP TR 21.905, 3GPP TS 23.501, 3GPP TS 24.501, 3GPP TS 33.800 and the following apply. An abbreviation defined in the present document takes precedence over the definition of the same abbreviation, if any, in TR 21.905.

5GC 5G Core Network
5GS 5G System
5G-AN 5G Access Network
5G-GUTI 5G Globally Unique Temporary Identifier
5G-S-TMSI 5G S-Temporary Mobile Subscription Identifier
5QI 5G QoS Identifier
AF Application Function
AMF Access and Mobility Management Function
AN Access Node
AS Access Stratum
AUSF Authentication Server Function
CP Control Plane
DL Downlink
DN Data Network
DNAI DN Access Identifier
DNN Data Network Name
EDT Early Data Transmission
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HR Home Routed (roaming)
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
N3IWF Non-3GPP InterWorking Function
NAI Network Access Identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
PCF Policy Control Function
PEI Permanent Equipment Identifier
PER Packet Error Rate
PFD Packet Flow Description
PPD Paging Policy Differentiation
PPI Paging Policy Indicator
PSA PDU Session Anchor
QFI QoS Flow Identifier
QoE Quality of Experience
(R)AN (Radio) Access Network
RLC Radio Link Control
RQA Reflective QoS Attribute
RQI Reflective QoS Indication
RRC Radio Resource Control
SA NR Standalone New Radio
SBA Service Based Architecture
SBI Service Based Interface
SD Slice Differentiator
SDAP Service Data Adaptation Protocol
SEAF Security Anchor Functionality
SEPP Security Edge Protection Proxy
SMF Session Management Function
S-NSSAI Single Network Slice Selection Assistance Information
SSC Session and Service Continuity
SST Slice/Service Type
SUCI Subscription Concealed Identifier
SUPI Subscription Permanent Identifier
UDSF Unstructured Data Storage Function
UL Uplink
UL CL Uplink Classifier
UPF User Plane Function
UDR Unified Data Repository
URSP UE Route Selection Policy
Evolved E-UTRAN: E-UTRANCE connected to both 5GC and EPC. It is ng-eNB as defined in 3GPP TS 38.300.
ePLMN: Equivalent PLMN.

Solution 1 for the Problem Statement 1:

When the UE does not receive any response to the registration request messages transmitted certain number of time via one access network type while the UE has registered to the 5GC via another access network type, the UE shall not delete the common NAS parameters shared between non-3GPP 5GMM context and 3GPP 5GMM contexts.

The main points of the solution are listed as below.

(1) The UE is registered to the 5GC (AMF) of a PLMN via first access network type (e.g. 3GPP access network). The UE has been assigned temporary parameters related to the 5GC e.g. UE Temporary identity (5G-GUTI), ngKSI, etc. The UE initiates an initial registration procedure by transmitting a first NAS message, using second access network type, to the same 5GC (AMF) of the registered PLMN of the first access network type to register to the 5GC. The UE retransmits the first NAS message to the same 5GC using second access network type after UE does not receive any response from the network in response of transmitting the first NAS message. The UE repeats this procedure of retransmission certain number of times. After the certain number of unsuccessful initial registration procedure, the UE keeps the temporary parameters assigned to the first access network type.

(2) The UE uses the temporary parameters for the NAS and AS procedure related to the first access network type.

(3) After the certain time interval the UE again initiates initial registration procedure by transmitting, via second access network type, the first NAS message containing the UE temporary identity to same 5GC (AMF) of the registered PLMN of the first access network type.

(4) The UE keeps using the temporary parameters in NAS or AS procedure related to second access network type.

(5) The first NAS message in above steps is REGISTRATION REQUEST message and is sent with registration type.

Figure 2:
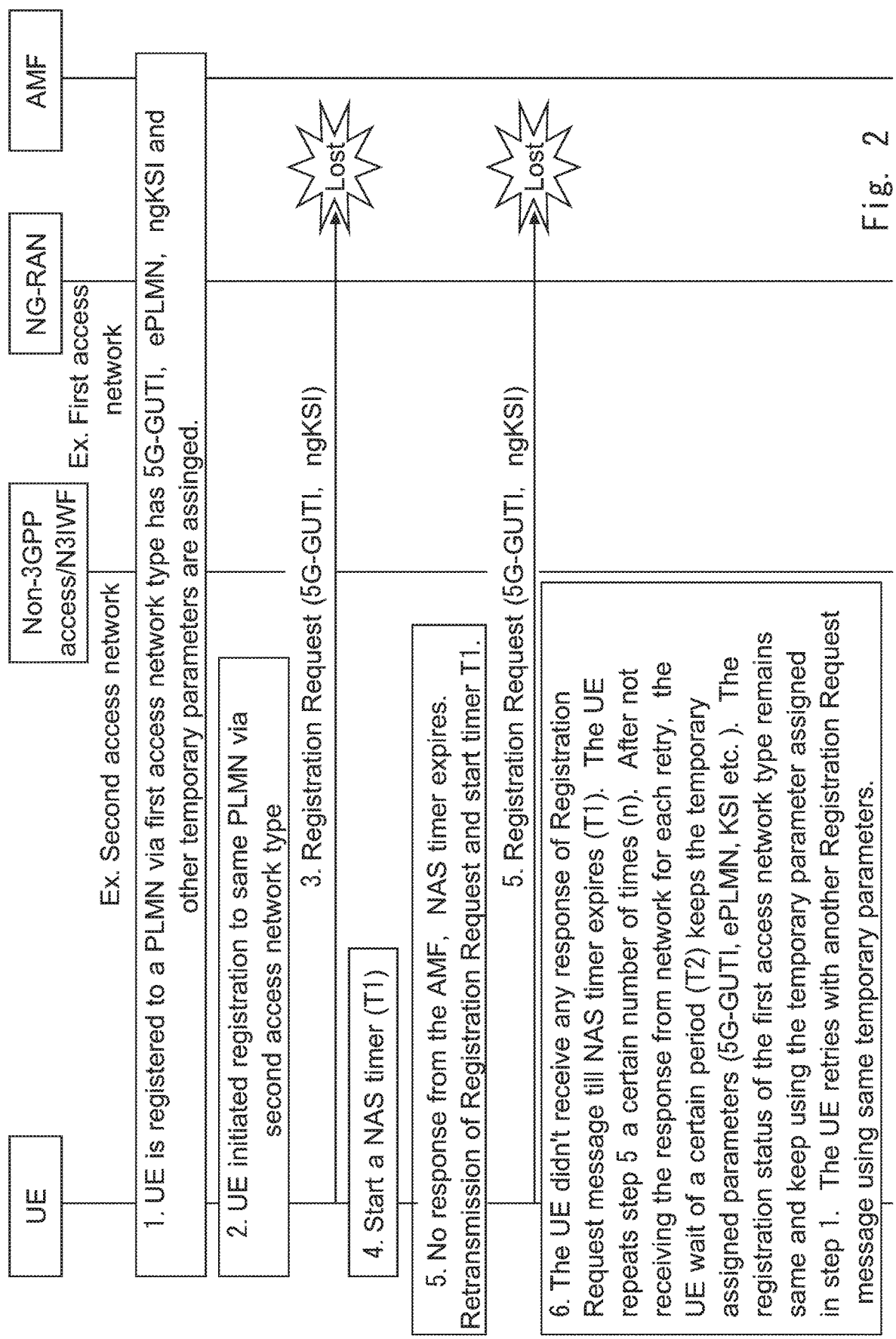
FIG. 2 shows Registration procedure over 3GPP Access and non-3GPP access connected to same AMF.

The detailed steps of solution 1 to solve issue 1 is as described FIG. 2.

1. The UE is registered to a 5GC (AMF) of a PLMN via a first access network type (e.g. 3GPP access network). The UE has been assigned temporary parameters (e.g. UE Temporary identity (5G-GUTI), ngKSI) related to the 5GC of the PLMN during the registration to the PLMN over the first access network time.

2. The UE is deregistered (e.g in 5GMM-DEREGISTERED state) over a second access network type (e.g. non-3GPP access network). The UE initiates initial registration procedure to the registered PLMN via a second access network type.

3. The UE transmits a first NAS message via the second access network type to the registered PLMN via the first access network type. The UE establishes the access stratum connection to the second access network type using 5G-GUTI. The UE sends the first NAS message containing the 5G-GUTI, which was assigned when the UE has been registered to the PLMN via the first access network type, to the second access network. The AS layer chooses the same AMF via which the registration was performed for the first access network type and forwards the first NAS message to the AMF.

4. The UE starts a timer T1. The duration of the timer T1 is in seconds (e.g. 10 seconds).

5. The timer T1 expires and if the UE have not received any response from the network in response of transmitting the first NAS message when the timer T1 expires, the UE retransmits the first NAS message containing the same 5G-GUTI to the PLMN over the second access network type and start the timer T1.

6. If the UE does not receive any NAS message in response of the transmitted the first NAS message in step 5, then the UE performs steps 5 for certain number of times. After the certain number of retry and for each retry if the UE has not received any NAS message, the UE keeps the temporary parameters (5G-GUTI, ngKSI, ePLMN etc.). The UE keeps using these parameters in the AS and NAS related procedure for the first access network type. The UE starts another timer T2. Upon expiry of timer T2, the UE continues this procedure starting with step 3.

In the above scenario/steps,

The first access network type and the second network type is 3GPP access network i.e. NG-RAN or non-3GPP access. The first access network type and second access network type are different i.e. if the first access network type is 3GPP access then the second access network type is non-3GPP access.

In the above steps the timer value of T2 is greater than timer value of T1. The timer T1 is T3510 as defined in 3GPP TS 24.501.

In the above steps the UE is in 5GMM-CONNECTED mode over first access network type or 5GMM-IDLE mode over first access network type.

In the above steps the first NAS message is an existing NAS message or a REGISTRATION REQUEST message as defined in 3GPP TS 24.501 or a new NAS message.

The UE transmits the first NAS message, e.g. Registration Request message, 5 times before starting the timer T2.

If the UE deletes the assigned temporary parameters (e.g. UE Temporary identity (5G-GUTI), ngKSI), some features don't work. One example of such situation is that security feature doesn't work in the first access network if the ng KSI is deleted. Another example of such situation is that no UE and the network initiated procedure is possible (e.g. the UE cannot be paged) in the first access network if 5G-GUTI is deleted. Therefore, there is a technical benefit if the UE keeps the assigned temporary parameters.

Variant of Solution 1:

(1) In one scenario, if the UE is not registered to first access network type then the UE in step 6 deletes temporary parameters (5G-GUTI, ngKSI, ePLMN and other temporary NAS parameters). Following this the UE either search for a new PLMN or starts timer T2. On expiry of timer T2, the UE sends a REGISTRATION REQUEST message using SUCI.

(2) In one scenario, after step 6 the UE receives Registration Accept message from the network via second access network type. Following this the UE enters 5GMM-REGISTERED state over second access network type.

(3) In one scenario, when the UE keeps the temporary parameters (5G-GUTI, ngKSI, ePLMN etc.) in step 6 the UE may release another parameters which are not assigned to the first access network type. Another parameters are different from the temporary parameters.

Solution 2 for the Problem Statement 2:

When the network (5GC (e.g. AMF)) does not receive any response to the REGISTRATION ACCEPT messages transmitted certain number of time via one access network type while the UE has registered to the 5GC via an another access network type, the network shall not delete the common NAS temporary parameters shared between non-3GPP 5GMM context and 3GPP 5GMM context and keep using the common NAS temporary parameters over the another access.

The main points of the solution are listed as below.

(1) The UE is registered to a 5GC (AMF) of a PLMN via a first access network type (e.g. 3GPP access network). The UE has been assigned a temporary parameter (e.g. UE Temporary identity (5G-GUTI), ngKSI) related to the 5GC of the PLMN during the registration to the PLMN over first access network type. The UE is in deregistered state (e.g. in 5GMM-DEREGISTERED state) over a second access network type (e.g. non-3GPP access network). The UE initiates initial registration procedure to the registered PLMN of the first access network type via a second access network type.

(2) The 5GC (AMF) receives a first NAS message requesting the 5GC to perform initial registration procedure over the second access network type. The 5GC accepts the initial registration request from the UE and transmits a second NAS message in response of the first NAS message indicating the UE that registration is successful. The 5GC includes a new value for the temporary parameter in the second NAS message. If a new value for the temporary parameter is included in the second NAS message, the 5GC starts a timer T3 and wait for the third NAS message from the UE in response of the second NAS message.

(3) If the network does not receive a third NAS message from the UE and the timer T3 expires then the network retransmits the second NAS message and starts the timer T3.

(4) The network repeats step 3 a certain number of time and if the network fails to receive the third NAS message from the UE then the network considers both the new value and the old value of the parameter as valid.

Figure 3A:
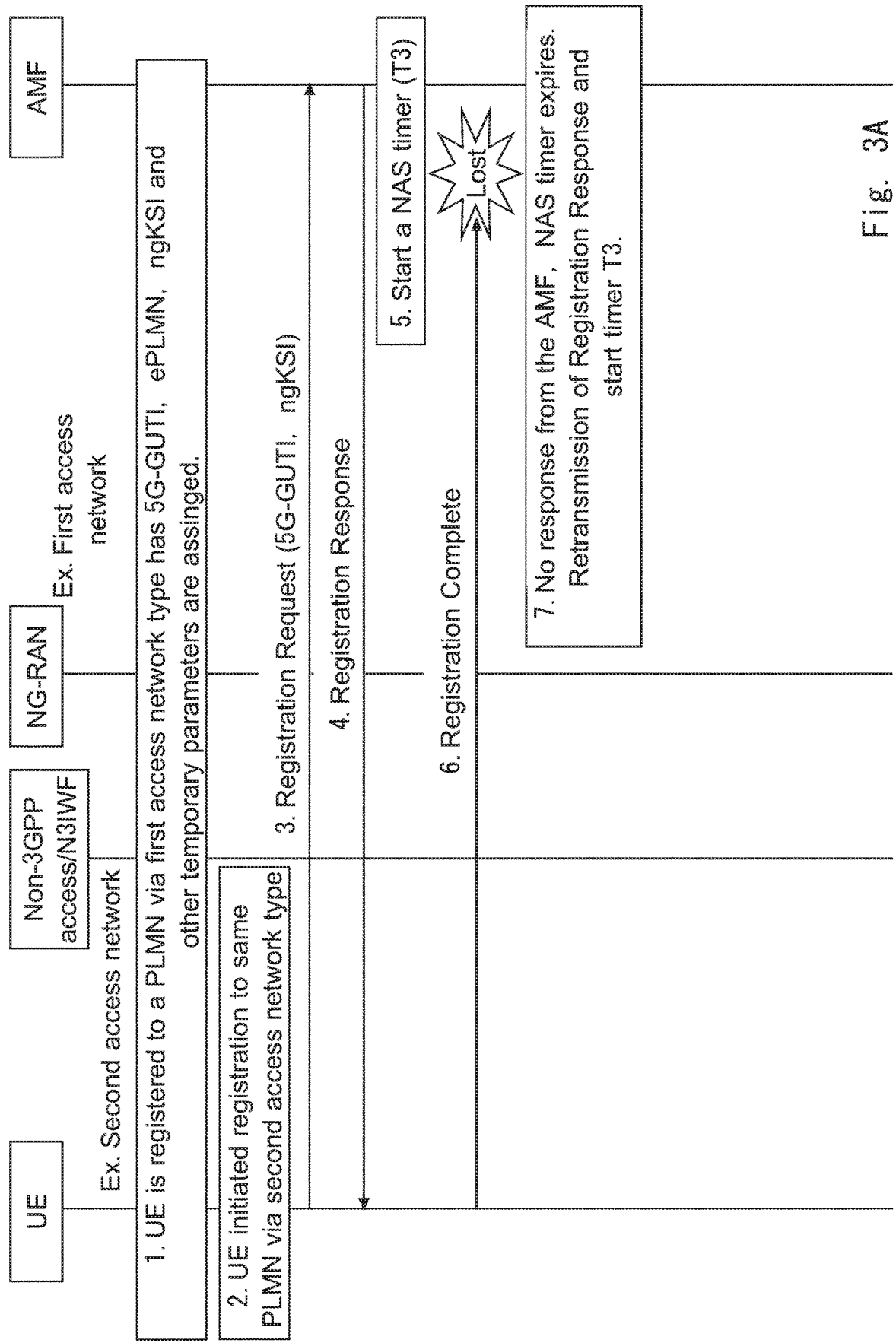
FIG. 3A Registration procedure over 3GPP Access and non-3GPP access connected to same AMF.
Figure 3B:
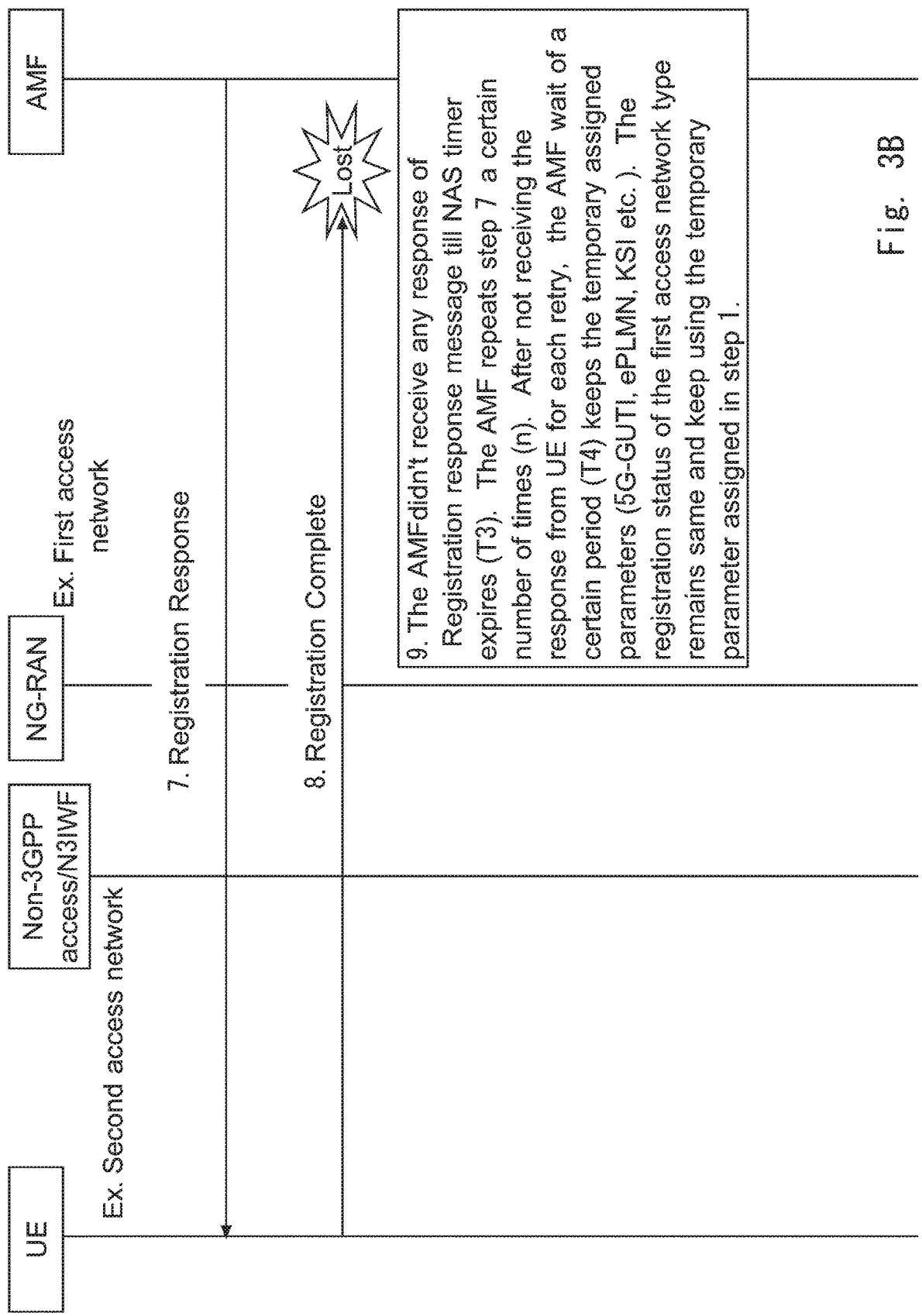
FIG. 3B Registration procedure over 3GPP Access and non-3GPP access connected to same AMF.

The detailed steps of solution 2 to solve problem statement 2 is as described in FIGS. 3A and 3B.

1. The UE is registered to a 5GC (AMF) of a PLMN via a first access network type (e.g. 3GPP access network). The UE has been assigned a temporary parameter (e.g. UE Temporary identity (5G-GUTI), ngKSI) related to the 5GC of the PLMN during the registration to the PLMN over first access network type.

2. The UE is in deregistered state (e.g. in 5GMM-DEREGISTERED state) over a second access network type (e.g. non-3GPP access network). The UE initiates initial registration procedure to the registered PLMN of the first access network type via a second access network type.

3. The 5GC (AMF) receives a first NAS message requesting the 5GC to perform initial registration procedure over the second access network type.

4. The 5GC accepts the initial registration request from the UE and transmits a second NAS message in response of the first NAS message indicating the UE that registration is successful. The 5GC includes a new value for the temporary parameter in the second NAS message.

5. If a new value for the temporary parameter is included in the second NAS message, the 5GC starts a timer T3 and waits for the third NAS message from the UE in response of the second NAS message.

6. The UE receives the second NAS message and transmits the third NAS message but the third NAS message is lost between the UE and the network.

7. When the timer T3 expires and the 5GC does not receive the third NAS message in response of the second NAS message from the UE while the timer T3 was running, the 5GC retransmits the second NAS message and restarts the timer T3.

8. The UE receives the second NAS message and transmits the third NAS message but the third NAS message is lost between the UE and the network.

9. The 5GC (AMF) repeats step 4 a certain number of timer (n). After certain number of retries if the 5GC does not receive any third NAS message in response of the second NAS message, the 5GC stops retransmission of the second NAS message and aborts the initial registration procedure over the second access network type. The registration status of the UE over the first access network type is not changed and any ongoing NAS procedure over the first access network type are not affected. The 5GC keeps both the new value of the temporary parameter as well as the old value of the temporary parameter. The 5GC treats both the new and the old value as valid over the first access network type. The 5GC uses the old value or the new value or both the new and old value in the UE initiated procedure or the network initiated procedure over the first access network type. When the 5GC receives any NAS message from the UE containing the first or the second value of the temporary parameter then the network consider them as valid. For example, if the 5GC receives the REGISTRATION REQUEST message containing the new value of the UE temporary identity which was assigned in step 4 then the 5GC identifies this UE with new value of the UE temporary identity.

Variant of solution 2:

(1) The temporary parameters in the above cases is UE's 5G temporary identity (5G-GUTI), extended DRX (eDRX), DRX, allowed registration area, non-allowed registration area, forbidden registration area or slice related information for example (allowed NS SAI, NSSP), URSP or other temporary parameters which is assigned to the UE and applicable for both the first access network type and the second access network type.

(2) The first NAS message, second NAS message and third NAS message are existing NAS message or a new NAS message. In one example the first NAS message is REGISTRATION REQUEST message, the second NAS message is REGISTRATION ACCEPT message and the third NAS message is REGISTRATION COMPLETE message.

(3) The first access network type and the second network access type are 3GPP access network (NG-RAN) or non-3GPP access. The first network access type is different than the second network type (e.g. if the first network type is 3GPP access than the second network type is non-3GPP access). In the above steps the UE is in 5GMM-CONNECTED mode over first access network type or 5GMM-IDLE mode over first access network type.

(4) In case where the 5GC (AMF) needs to page the UE (i.e. down link packet arrives to the UE or the 5GC needs to send the signaling message to the UE) and a temporary parameters are 5G-GUTIes, the 5GC (AMF) pages twice using one with old 5G-GUTI and the other one with new 5G-GUTI.

(5) In case where the 5GC (AMF) needs to page the UE (i.e. down link packet arrives to the UE or the 5GC needs to send the signaling message to the UE) and a temporary parameters are eDRXes, the 5GC (AMF) pages twice using one with old eDRX and the other one with new eDRX. The first page may occur with an eDRX that paging occasion comes earlier than the other eDRX. If the first page fails, then the 5GC (AMF) pages UE with the other eDRX.

(6) In one scenario when the UE is attached to a PLMN via both a first access network type and a second access network type and the network receive a NAS message (e.g. REGISTRATION REQUEST message) related to mobility update procedure, periodic update procedure or other procedure then the network (5GC (AMF)) will follow the steps 4 to 9.

(7) In another scenario when the UE is attached to a PLMN via both a first access network type and a second access network type and the network initiates a NAS procedure to update the UE temporary parameters (e.g. UE temporary identity (5G-GUTI)) then the network (5GC (AMF)) will follow step 4 to 9. An example of this scenario is Generic UE configuration update procedure.

(8) After successful the paging procedure while the 5GC (AMF) keeps two set of temporary parameters (e.g. 5G-GUTIes and eDRX parameters), the 5GC (AMF) keeps only the one set of temporary parameters for the UE that was used for successful paging procedure. In other words, the 5GC (AMF) deletes the other one set of temporary parameters.

(9) After successful the registration procedure while the 5GC (AMF) keeps two set of temporary parameters (e.g. 5G-GUTIes and eDRX parameters), the 5GC (AMF) keeps only the one set of temporary parameters for the UE that was used for successful registration procedure. In other words, the 5GC (AMF) deletes the other one set of temporary parameters.

If the network keeps one temporary parameters (e.g. UE Temporary identity (5G-GUTI), ngKSI), some features don't work. One example of such situation is that no the network initiated procedure is possible (e.g. the UE cannot be paged) in the first access network as the UE may keep the other temporary parameters (e.g. UE Temporary identity (5G-GUTI) than the one the networks keeps. Therefore, there is a technical benefit if the network keeps both old and new temporary parameters for a while.

User Equipment (UE)

Figure 4:
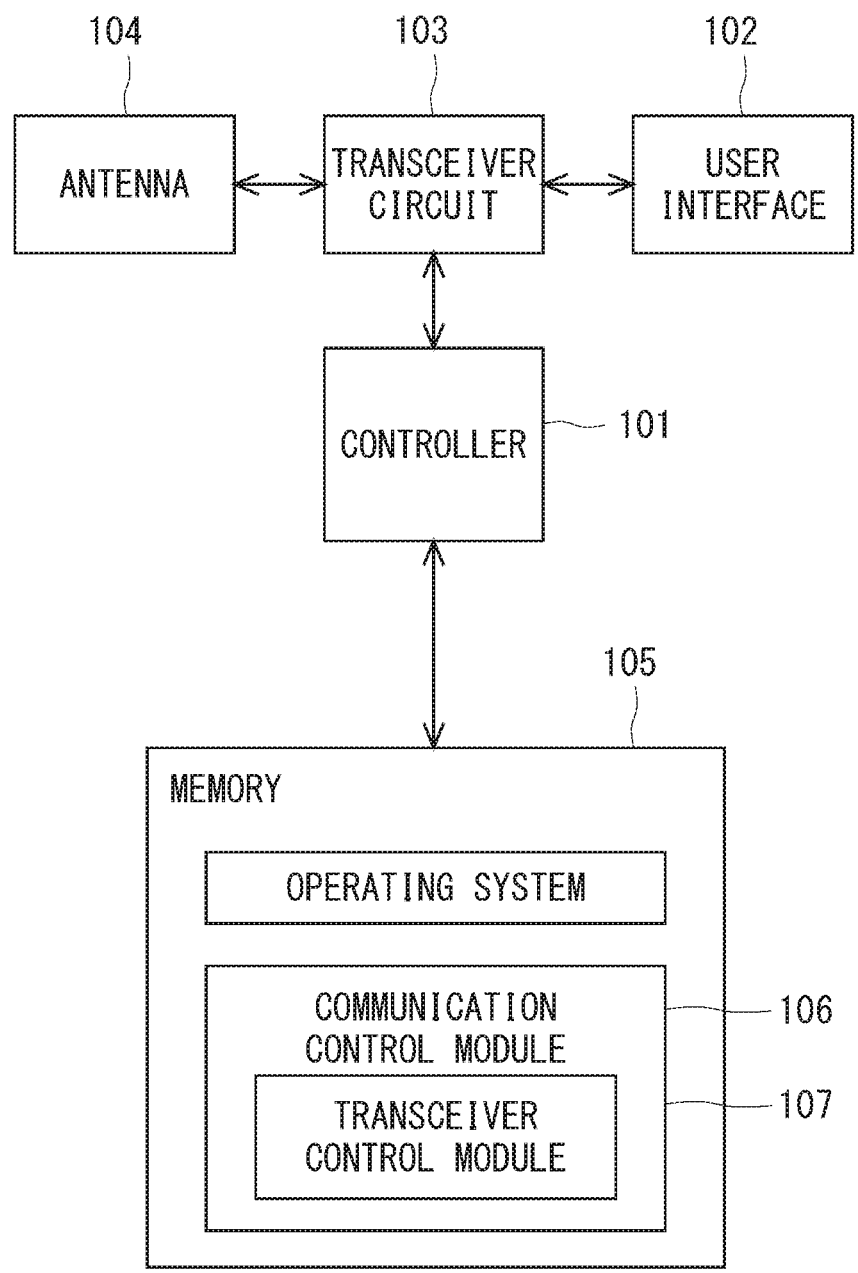
FIG. 4 shows a bock diagram for UE.

FIG. 4 is a block diagram illustrating the main components of the UE. As shown, the UE (100) includes a transceiver circuit (103) which is operable to transmit signals to and to receive signals from the connected node(s) via one or more antenna (104). Although not necessarily shown in FIG. 4, the UE will of course have all the usual functionality of a conventional mobile device (such as a user interface (102)) and this may be provided by any one or any combination of hardware, software and firmware, as appropriate. Software may be pre-installed in the memory and/or may be downloaded via the telecommunication network or from a removable data storage device (RMD), for example.

A controller (101) controls the operation of the UE in accordance with software stored in a memory (105). The software includes, among other things, an operating system and a communications control module (106) having at least a transceiver control module (107). The communications control module (106) (using its transceiver control sub-module) is responsible for handling (generating/sending/receiving) signalling and uplink/downlink data packets between the UE and other nodes, such as the base station/(R)AN node, the MME, the AMF (and other core network nodes). Such signalling may include, for example, appropriately formatted signalling messages relating to connection establishment and maintenance (e.g. RRC connection establishment and other RRC messages), periodic location update related messages (e.g. tracking area update, paging area updates, location area update) etc. Such signalling may also include, for example, broadcast information (e.g. Master Information and System information) in a receiving case.

(R)AN Node

Figure 5:
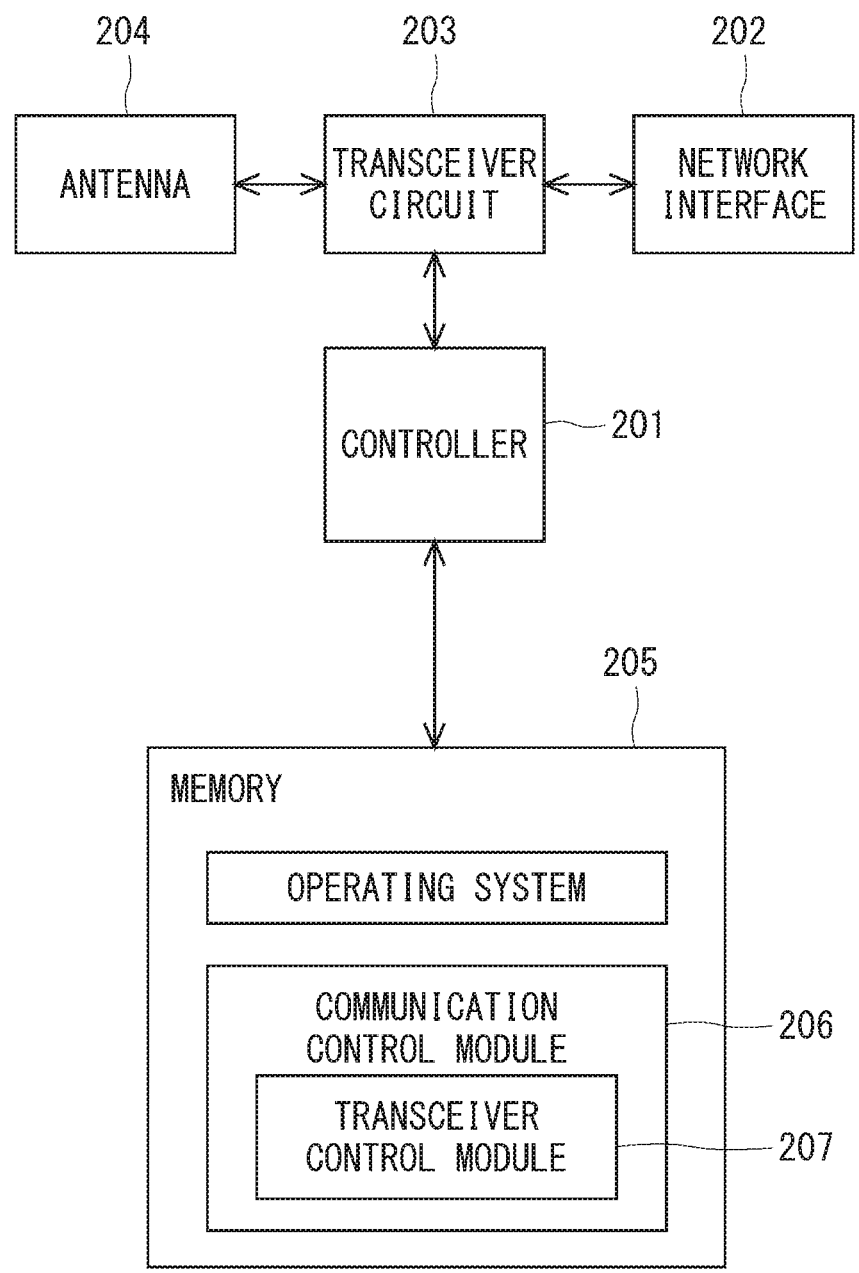
FIG. 5 shows a bock diagram for (R)AN node.

FIG. 5 is a block diagram illustrating the main components of an exemplary (R)AN node (200). The (R)AN node (200) includes 3GPP Access Node and Non 3GPP Access Node. The 3GPP Access Node may be, a base station ('eNB' in LTE, 'gNB' in 5G). As shown, the (R)AN node (200) includes a transceiver circuit (203) which is operable to transmit signals to and to receive signals from connected UE(s) via one or more antenna (204) and to transmit signals to and to receive signals from other network nodes (either directly or indirectly) via a network interface (202). A controller (201) controls the operation of the (R)AN node in accordance with software stored in a memory (205). Software may be pre-installed in the memory and/or may be downloaded via the telecommunication network or from a removable data storage device (RMD), for example. The software includes, among other things, an operating system and a communications control module (206) having at least a transceiver control module (207).

The communications control module (206) (using its transceiver control sub-module) is responsible for handling (generating/sending/receiving) signalling between the (R)AN node and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), messages by Y2 reference point, etc. Such signalling may also include, for example, broadcast information (e.g. Master Information and System information) in a sending case.

The controller is also configured (by software or hardware) to handle related tasks such as, when implemented, UE mobility estimate and/or moving trajectory estimation.

AMF

Figure 6:
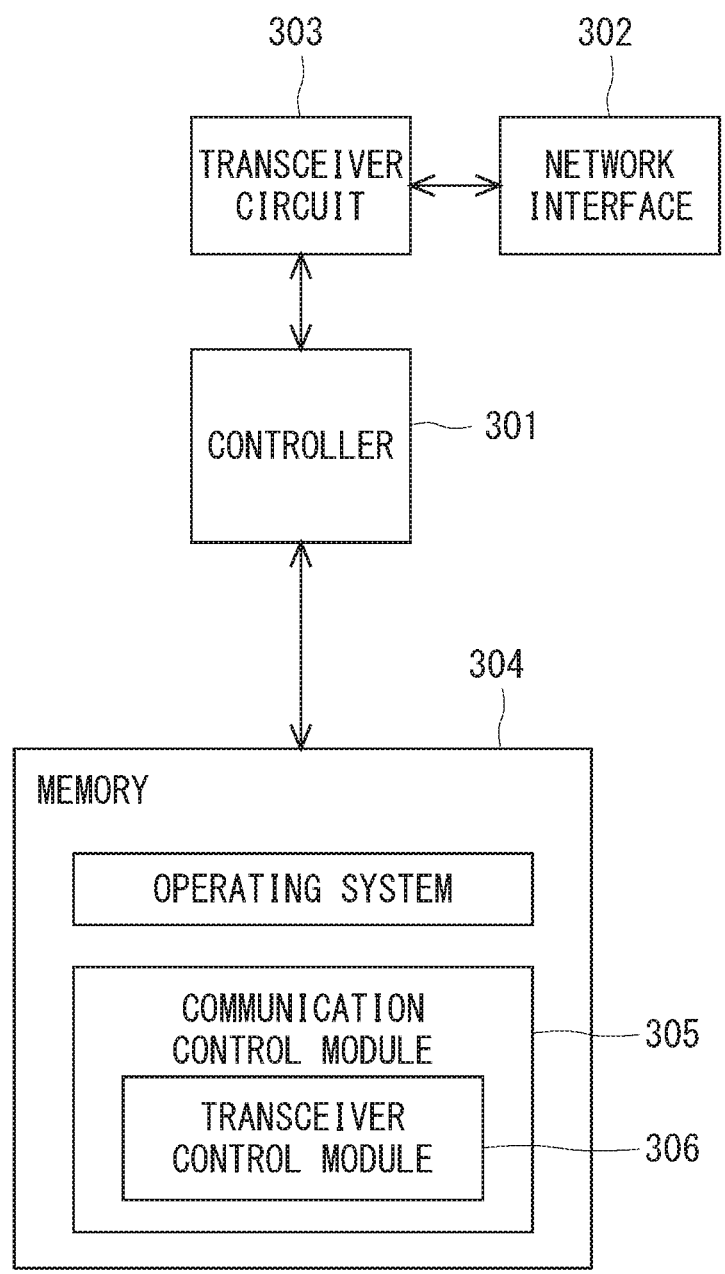
FIG. 6 shows a bock diagram for AMF.

FIG. 6 is a block diagram illustrating the main components of the AMF (300). The AMF (300) is included in the 5GC. As shown, the AMF (300) includes a transceiver circuit (303) which is operable to transmit signals to and to receive signals from other nodes (including the UE) via a network interface (302). A controller (301) controls the operation of the AMF (300) in accordance with software stored in a memory (304). Software may be pre-installed in the memory (304) and/or may be downloaded via the telecommunication network or from a removable data storage device (RMD), for example. The software includes, among other things, an operating system and a communications control module (305) having at least a transceiver control module (306).

The communications control module (using its transceiver control sub-module) is responsible for handling (generating/sending/receiving) signalling between the AMF and other nodes, such as the UE, base station/(R)AN node (e.g. "EUTRAN Node" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

This application is based upon and claims the benefit of priority from Indian patent applications No. 201811011620, filed on Mar. 28, 2018, the disclosure of which is incorporated herein in its entirety by reference.

REFERENCE SIGNS LIST

100 UE
101 controller
102 user interface
103 transceiver circuit
104 antenna
105 memory
106 control module
107 transceiver control module
200 (R)AN node
201 controller
202 network interface
203 transceiver circuit
204 antenna
205 memory
206 communications control module
207 transceiver control module
300 AMF
301 controller
302 network interface
303 transceiver circuit
304 memory
305 communications control module
306 transceiver control module

The invention claimed is:

1. A method of a user equipment configured to perform a registration procedure with a same Access and mobility Management Function (AMF) via a 3rd Generation Partnership Project (3GPP) access and a non-3GPP access, the method comprising:
 performing a registration with the AMF via one access network among the 3GPP access and the non-3GPP access, separately from a registration via another access network that is different from the one access network;
 starting a timer (T3510) in a case where the registration via the one access network is performed;
 incrementing a number of times of registration attempt via the one access network in a case where the timer (T3510) expires; and
 keeping a 5G-Globally Unique Temporary Identity (5G-GUTI) that is assigned for the another access network, in a case where the user equipment is registered with the AMF via the another access network and the number of times of the registration attempt via the one access network is equal to a maximum number, wherein
  the 5G-GUTI is common to both the 3GPP access and the non-3GPP access.

2. A user equipment configured to perform a registration procedure with a same Access and mobility Management Function (AMF) via a 3rd Generation Partnership Project (3GPP) access and a non-3GPP access, the user equipment comprising:
 a memory; and
 at least one hardware processor coupled to the memory, wherein the at least one hardware processor is configured to:
  perform a registration with the AMF via one access network among the 3GPP access and the non-3GPP access, separately from a registration via another access network that is different from the one access network;
  start a timer (T3510) in a case where the registration via the one access network is performed;
  increment a number of times of registration attempt via the one access network in a case where the timer (T3510) expires; and
  keep a 5G-Globally Unique Temporary Identity (5G-GUTI) that is assigned for the another access network, in a case where the user equipment is registered with the AMF via the another access network and the number of times of the registration attempt via the one access network is equal to a maximum number,
 wherein the 5G-GUTI is common to both the 3GPP access and the non-3GPP access.

* * * * *